(12) United States Patent
Blanke-Bohne et al.

(10) Patent No.: US 7,753,092 B2
(45) Date of Patent: Jul. 13, 2010

(54) DEVICE FOR FEEDING DANGEROUS LIQUIDS

(75) Inventors: Johannes Blanke-Bohne, Bochum (DE); Reinhold Marquardt, Gelsenkirchen (DE)

(73) Assignee: Thixo II GmbH, Bochum (DE)

( * ) Notice: Subject to any disclaimer, the term of this patent is extended or adjusted under 35 U.S.C. 154(b) by 1082 days.

(21) Appl. No.: 11/408,211

(22) Filed: Apr. 19, 2006

(65) Prior Publication Data

US 2006/0231160 A1 Oct. 19, 2006

(30) Foreign Application Priority Data

Apr. 19, 2005 (WO) ............... PCT/DE2005/000716

(51) Int. Cl.
 *B65B 1/04* (2006.01)
(52) U.S. Cl. .................. 141/231; 141/69; 141/104; 141/263; 141/274; 220/560.03; 220/564; 137/899
(58) Field of Classification Search .................. 141/38, 141/67, 69, 100, 104, 231, 285–286, 363, 141/374, 383; 220/560.3, 564; 137/351, 137/899
See application file for complete search history.

(56) References Cited

U.S. PATENT DOCUMENTS

| | | | | |
|---|---|---|---|---|
| 4,857,111 A | | 8/1989 | Haubennestel | |
| 6,026,974 A | * | 2/2000 | Burt | 220/564 |
| 6,889,723 B2 | * | 5/2005 | Gerresheim et al. | 141/38 |
| 7,578,323 B2 | * | 8/2009 | Baehring et al. | 141/104 |
| 2006/0231560 A1 | * | 10/2006 | Blanke-Bohne et al. | 220/560.02 |

FOREIGN PATENT DOCUMENTS

DE 20011086 U1 * 1/2001

OTHER PUBLICATIONS

Macnine translation of DE20011086U1, pp. 1-2.*

* cited by examiner

*Primary Examiner*—Gregory L Huson
*Assistant Examiner*—Nicolas A Arnett
(74) *Attorney, Agent, or Firm*—Walter A. Hackler

(57) ABSTRACT

A device for feeding one or more substances thixotroping a liquid to a container for storing said liquid, is characterized in that the device comprises a tank containing thixotroping substances, a feeding means for transportation of the thixotroping substances from the tank into the container which contains the liquid, and a pressure generating means for generating a pressure gradients in the thixotroping substances within the feeding means which is directed from the tank to the container. By means of the device according to the invention thixotroping substances can be fed into fluid within the container, in order to prevent discharging and leakage respectively under certain defined circumstances.

16 Claims, 2 Drawing Sheets

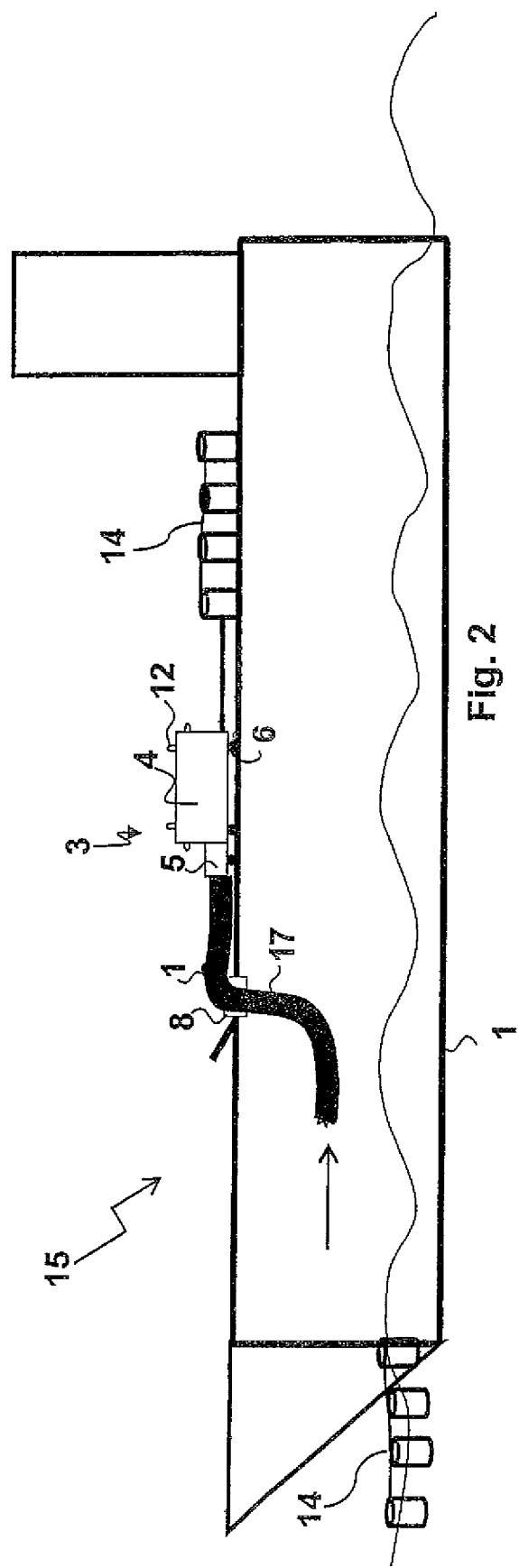

DEVICE FOR FEEDING DANGEROUS LIQUIDS

This application claims Paris Convention priority of PCT/DE 2005/000716 filed Apr. 19, 2005 the complete disclosure of which is hereby incorporated by reference.

BACKGROUND OF THE INVENTION

The invention relates to a device for feeding one or more substances thixotroping a liquid to a container for storing said liquid.

Containers for storing a liquid with a device for feeding thixotroping substances into said container are used in the chemical industry when liquids are to be solidified by the addition of a suitable agent (thixotropy) without any major temperature variation being required as in the case of solidification by freezing. A 2-component adhesive is similarly solidified, for example, but in this case the solidifying component is a hardener which gives rise to a generally irreversible solidification as a result of a chemical reaction with the first component, whilst in thixotropy solidification is caused by physical interaction of the components, which can also be reversed (re-liquefaction). DE 37 06 860 C2, for example, describes a thixotropic preparation using highly dispersive silicon oxide.

The handling of liquids in daily life may be associated with different risks. For example, an accident during the transport of dangerous liquid goods generally results in the dangerous goods escaping from the tank, and diversely contaminating the environment over a large area. In the case of combustible liquids an explosive flame may develop. DE 28 13 449 A1 discloses a device for sealing leakage points on tanks in which the medium escaping from the leakage point is solidified by means of a coolant by freezing the medium. However, the medium to be solidified must in this case be cooled to below its melting temperature. A thixotropy, i.e. rapid solidification of the dangerous liquids, could in such emergencies contribute to preventing disasters. The same also applies to the prevention of a fire or explosion of a fuel tank in vehicles which have been involved in an accident or to the prevention of environmental damage in the event of damage to a tanker at sea. A further example that could be mentioned is the accidental leakage from a slurry tank and the resultant environmental pollution. Here too a more serious disaster could be avoided with the targeted initiation of a thixotropic "reaction".

It is therefore the underlying object of this invention to suggest a device of the type already described by means of which thixotroping substances are fed to the fluid within the container and therewith preventing the liquid from being discharged or from escaping under certain defined circumstances.

SUMMARY OF THE INVENTION

This object is achieved in accordance with the invention in that the device comprises a tank containing thixotroping substances, a feeding means for transportation of the thixotroping substances from the tank into the container which contains the liquid, and a pressure generating means for generating a pressure gradients in the thixotroping substances within the feeding means which is directed from the tank to the container.

The feeding of thixotroping substances into the liquid in the container may take place mechanically, electrically, magnetically or pneumatically, for example by gas pressure, by means of pumps or other suitable devices. To achieve a rapid, comprehensive thixotropic reaction when necessary, it is advantageous if the feeding of the thixotroping substances to the liquid within the container is carried out under the influence of an external force.

The device is preferably designed so that it supplies the thixotroping substance or substances to the liquid in the container due to a signal from a signal transmitter, so that the liquid is completely thixotroped, at least in a closed outer layer inside the container that cannot be penetrated by a residue of the liquid that is possibly not thixotroped. This layer may extend throughout the entire inner surface of the container, but possibly also over an intrinsically closed partial area, for example as a sealing surface or plug at a point where the container is damaged from the outside. Variants in which partial areas of the liquid are thixotroped in the volume of the container are also conceivable, possibly in the form of solid honeycomb structures inside the residual liquid.

This can, for example, safely prevent combustible, explosive, toxic liquid, or liquid that otherwise pollutes the environment, from escaping from the container in defined situations when the corresponding signal from the signal transmitter is present, since it is solidified, at least in its outer layer, by addition of the thixotroping substances. Instead of taking place in the outer layer only the thixotropy may also be carried out completely by adding the thixotroping substances also to the inside of the fluid volume, thereby solidifying it. This also prevents undesirable escape of the liquid from the container, but in this case the "through-reaction" inside the volume takes a much longer time than thixotroping the outer envelope only.

The device according to the invention is particularly advantageous if the liquid in the container is a dangerous product. In an emergency, an accident can be prevented by means of the invention, particularly in the case of combustible and/or explosive liquids, but even if the liquid in the container is corrosive and/or toxic, particularly an acid, lye or liquid toxic substances. This also applies when the invention is used in the case of environmentally harmful, in particular soil and/or groundwater contaminating liquids, for example slurry, liquid softeners, solvents and the like.

So that the presence of an emergency or even a looming accident can be safely detected, the signal transmitter is connected to one or more sensors which are capable of detecting corresponding risk situations in the case of particularly preferred embodiments of the device according to the invention.

In the case of special developments of the embodiments the sensors are capable, depending on the application, of detecting positive or negative accelerations (e.g. in the event of a vehicle collision) and/or temperatures and/or temperature variations (e.g. at the beginning of a fire) and/or position changes of the container or liquid in the container (e.g. when the load in a transporter or tanker slides or is displaced) and/or variations in the liquid in the container or leakage conditions of the container and/or smoke or gas development in the area surrounding the container. With detection of such an event, a signal can be send to a device according the invention, whereupon the feeding or the thixotroping substances into the container can be started by means of the signal transmitter. If the affected container is not already equipped with a device according to the invention it is possible that the sensors send a signal comprising the local coordinates of for example the ship which met with an accident to a station in order to arrange a transport of the device according to the invention to the place of accident.

In a further advantageous embodiment of the device according to the invention, the signal transmitter is connected to a manual control element, particularly an emergency off transmitter, so that an operator can initiate the thixotropy "by hand" in an emergency, or transmit the required data to e.g. an aid organization for delivery of the device.

A further preferred embodiment of the invention provides that the thixotroping substances are selected from the group of surface active metal oxides (=Aerosils®), in particular $SiO_2$ and/or $TiO_2$ and/or $Al_2O_3$ and/or $ZrO_2$ and/or $Fe_2O_3$. Generally pyrogenic silicic acids are considered as amplifiers, i.e. metal oxides in pure form or as mixtures in the molecular level or as fine particles.

The thixotroping substances may be present, according to the application, in the form of powder, emulsion, gel, paste and/or suspension. Finely divided surface-active solids with a particle size of less than 0.1 mm, preferably under 0.05 mm, are used in particular as thixotroping substances. The free surface of these particles is between 20 and 600 $m^2$ per gram of the substance. In this case the surface of the particles contains chemical groups which are capable of interacting with other substances. These groups may be part of the particles themselves, or may even be external substances which are either coupled solidly to the particles or are also associated by polar forces with the particles.

A particularly preferred embodiment of the device according to the invention provides that the thixotroping substances are present in close spatial association with one or more carrier agents.

Alternatively, however, the thixotroping substances may also be present as tablets, chips or granulate.

Highly preferred is an embodiment of device according to the invention in which one or more adhesive agents are added to the thixotroping substances. This gives rise to permanent adhesion of the thixotroped layer on the corresponding inner surface of the container, thus ensuring that no fluid is able to escape from the inside of the container.

In advantageous developments of this embodiment, adhesive agents such as polyalcohols and/or polysaccharides and/or polycarbonic acids and/or their salts and/or esters of the inorganic acids, in particular esters of the acids of sulfur and/or phosphorus, may be provided.

Since great speed is required in emergency situations to prevent a major accident, the device for feeding thixotroping substances to the fluid in the container and/or the nature and particle size of the thixotroping substances, is chosen in particularly preferred embodiments of the invention so, that when a signal from the signal transmitter is present, thixotropy of the liquid takes place in a closed outer layer within less than one hour (for example after damage to a tanker at sea), and in particular within less than 5 minutes (for example, when a leak from a larger tank commences), but preferably within less than 2 seconds (in the case of road traffic accidents).

A special embodiment of the invention is designed so that the spatial partial areas of the liquid in the volume of the container can be thixotroped, particularly in the form of solid honeycomb structures within the residual fluid. For example, sufficient inner stability can therefore be imparted to a tanker that has run aground on a reef to prevent it from breaking up and sinking.

In order to be able to reverse the thixotropy in the particular application, if necessary, a further device for feeding surface-active agents, particularly tensides, is provided in a particularly preferred embodiment of the device according to the invention, for re-liquefaction of thixotroped material.

The device according to the invention may be connected permanently or detachably to a land vehicle, water vessel or aircraft. Therewith the device can connected to the corresponding vehicle for operation by means of hooks and eyes. Also a magnetical connection is possible, which simplifies the mounting significantly and goes without further fixation means.

The container may be arranged stationary, for example a chemical tank in a factory or a large slurry tank on a farm.

The container may be open at the top or designed as a closed fluid tank.

In special cases the container may also be made of a stable and extremely tearproof foil. This may serve as e.g. interim storage for the thixotroped liquid of another container at risk which has to be emptied quickly.

The feeding means is preferably flexible, in particular designed as an agile hose. Thus the thixotroping substances an also be fed into openings which are difficult to access.

Particularly advantageous is an embodiment according to the invention, at which one or several nozzles are provided at the container-sided end of the flexible feeding means. Thus the thixotroping substances can be distributed systematically within the container. In the case that the nozzles are aligned in different directions the thixotroping substances can be inserted over a wide area within the container.

In order to deliver the thixotroping substances to a defined place within the container it is advantageous if driving means and a control means for said driving means are provided at the container-sided end of the flexible feeding means. The control means can be operated manually or form an intelligent system itself, which detects the actual position of the container-sided end of the flexible feeding means and the desired usage site and which navigates the driving means accordingly.

The pressure generating means, which guides the pressurized fluid (e.g. pressurized air) through nozzles which are directed in opposition to the desired direction of movement, may for example serve as driving means. Also propeller means are possible which mix the discharging thixotroping substances and the fluid within the container at the same time.

The feeding of the thixotroping substances into the fluid within the container can be carried out mechanically, electrically, magnetically or pneumatically, for example by gas pressure, by means of pumps or other suitable devices. In a preferred embodiment the pressure generating means comprises one or several compressors, in particular high pressure compressors. Using the compressors the pressure gradient, which is necessary for feeding the thixotroping substances, can be generated, so that the thixotroping substances are fed into the fluid within the container by means of said pressure gradient in case of the existence of a signal from the signal transmitter.

Another embodiment provides a withdrawal means which sucks the liquid to be thixotroped out of a fist container and pumps it into a second container or back to the first container for thixotroping purposes.

The withdrawal means can be designed in form of a separate hose. Therewith the first container is emptied and the dangerous fluid is thixotropical capable for interim storage. In case of an endangered tanker the containers can be misplaced into the sea and can be taken up again at a later point of time.

The thixotroping can take place between the discharging of the fluid out of the first container and the feeding of the fluid into the first or the second container. It is also possible to start the thixotroping process not until the fluid is provided within the second container.

Another variant of the device according to the invention can be designed such that the thixotroping substances are added to the fluid within the device according to the invention, whereby the thixotropic state is reached after filling of the containers.

An especially preferred embodiment provides several second containers which are connected to each other. This may concern e.g. an endless hose which is divided into different chambers or which is separated in defined distances by means of clamps or other means during the feeding process. Thus a good portion of the second container stays intact although one of the chambers may be damaged. It is also possible to provide predetermined breaking points between the single chambers in order to avoid a global damage of the hose, e.g. during a thunderstorm.

In particular with usage of the device according to the invention in conjunction with tankers at main sea it is advantageous if the content of the second container has a density less than the density of water, since the second container is then able to swim at the surface of the water and accordingly can be retrieved quickly. Therefore it is advantageous to fill the second containers with air or another gas additionally to the thixotroped fluid in case that the thixotroped fluid has a greater density than the water which surrounds the second container, such that it results in a content of the second container featuring the desired density.

Preferably the device is designed as a mobile operation station and is equipped for transportation via land vehicles, water vessels, aircrafts or helicopters. The device can be carried along directly with the mentioned means of transportation during the transport of the dangerous goods. The embodiment as a mobile operation station allows the possibility to transship the device arbitrarily; thus the device according to the invention is not bound to a certain vehicle. In case of an accident it is particularly economical if the device according to the invention is transported to the scene of accident by means of the mentioned means of transportation. The mobile operation station can be advantageously used for missions of an aid organization during an emergency situation (vessel disaster, traffic accidents inundations).

The present invention concerns also a method for usage of the device according to the invention, whereby the liquid in the container is completely thixotroped, in case a signal from the signal transmitter is present. The liquid may, for example, be the fuel in the tank of a vehicle, and the event triggering the signal may be an accident. This will then prevent an even worse situation, such as a fire or an explosion.

Alternatively a method can be advantageous whereby a completely thixotroped closed outer layer inside the container is generated which extends over an intrinsically closed partial area of the inner surface of the container, in particular as a sealing surface or plug at a point where the container is damaged. The thixotropy of the liquid in the container is therefore carried out specifically where it is needed. What is of major significance, economically, is a method variant in which the thixotroped substance is subsequently re-liquefied, if applicable, after a time interval has elapsed, such that at least the bulk of the liquid may be re-used Also advantageously is a variant of the method in which the fluid is partially thixotroped, prophylactically, even before a signal is transmitted from the signal transmitter is existent. This is recommended, for example, during planned transport of dangerous goods, for example after the loading of a tanker.

In a first alternative of this method variant the liquid is homogeneously partially thixotroped, increasing the viscosity of the liquid, which on the one hand makes leakage considerably difficult and delays it in an emergency, in contrast to the volatile condition, and on the other hand shorts the time required for "through-reacting", i.e. the carrying out of complete thixotropy when a dangerous situation arises, which will be indicated by the signal from the signal transmitter.

A second alternative is characterized in that an outer solid layer is produced as a result of the partial thixotropy of the liquid, which layer surrounds a core of residual liquid. This would, for example, certainly create a "third envelope" in the case of a modern double envelope tanker, which provides, for example, additional protection against an environmental disaster due to leaking oil or the like if the tanker runs aground on a reef.

A method variant in which the container is filled with liquid, full or partial thixotropy of the liquid in the container is then carried out by actuating the signal transmitter, the container is freighted to a destination spatially distant from the place of filling, the thixotroped substance re-liquefied, and the liquid drained from the container, is suitable as a standard method. A much greater degree of safety for people and the environment can be achieved in this manner by using the device according to the invention specifically in the transport of dangerous goods.

Finally, another advantageous variant of the method according to the invention is characterized in that the container is filled with liquid and full thixotropy of honeycomb-shaped partial areas of the liquid in the container, particularly of solid hexagonal honeycomb structures, is then effected by actuating the signal transmitter. As mentioned above, this may impart to a tanker that has got into distress, for example, sufficient inner stability to prevent the hull from breaking up and the vessel from sinking.

It can also be advantageously to suck the liquid to be thixotroped out of the first container by the withdrawal means and to pump it into a second container or into the device itself for thixotroping purposes. The thixotropy process can then take place within the second container or within the device itself.

Thereby the thixotroping substances can be fed to the liquid to be thixotroped during withdrawal of the liquid out of the first container or during the delivery of the liquid into the second container or the device itself.

Preferably the thixotroped liquid is fed to the second container or is fed back to the first container and is stored there in an environmentally compatible way until the final salvage. This is relevant especially when a direct suction of the liquid e.g. of a tanker in an accident container to a rescue tanker is not possible because of meteorological conditions.

Further advantages of the invention can be extracted from the description and the drawing. The features mentioned above and below can be used individually or collectively in arbitrary combination. The embodiments shown and described are not to be understood as exhaust enumeration but have exemplary character for describing the invention.

BRIEF DESCRIPTION OF THE DRAWING

FIG. 2 shows another embodiment providing a withdrawal means which sucks the liquid to be thixotroped out of a tanker and pumps it into a second container for thixotroping purposes.

DESCRIPTION OF PREFERRED EMBODIMENTS

Figure 1:
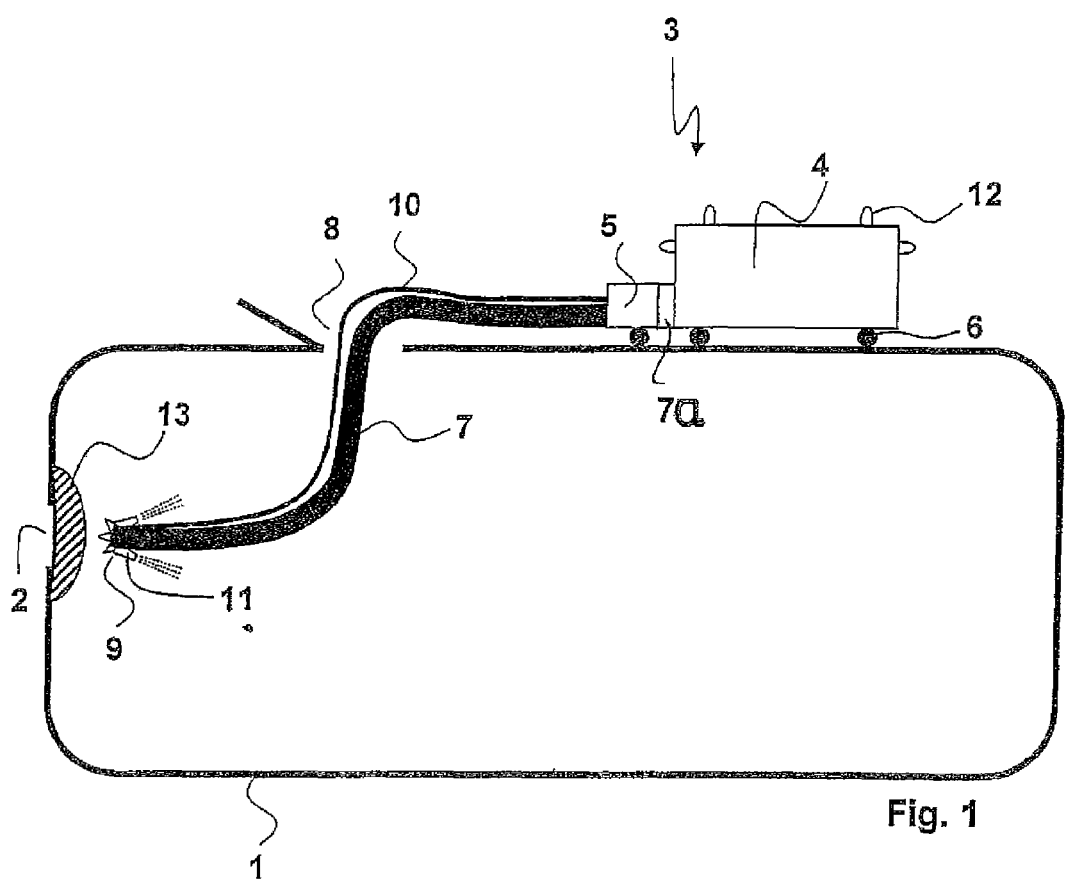
FIG. 1 shows an embodiment of the device according to the invention which is positioned on a container and by means of which thixotroping substances can be fed to the fluid.

The device according to the invention for feeding thixotroping substances is especially advantageous for mobile service during an accident, in particular in connection with dangerous goods. The device can be transported to the container with the fluid to be thixotroped by means of helicopters, water vessels or other means of transportation and can be positioned and, if needed, fixed to the container itself or to the means of transportation which carries the container.

Dangerous Goods Tank

Dangerous goods tanks or containers may include all stationary and moving systems in which dangerous goods are stored. Examples: road tankers, rail tank cars, fuel tanks in motor vehicles, ships and aircraft, tankers in ocean-going and inland shipping, fuel oil tanks, and storage tanks for dangerous goods.

Thixotroping Material

Thixotroping substances are capable of solidifying liquids to prevent leakage or undesirable dispersal over large areas or spaces in the surrounding environment. Thixotroping substances are present in the form of dust, but may also be mixed in liquids.

Re-liquefaction And Surface-Active Agents

Surface-active agents are capable of converting solidified liquids to their original liquid form by thixotropy. The thixotroping substances and surface-active agents supplied may be regained in the process by filtration or distillation, for example.

FIG. 1 shows a container 1 with a leak 2, the container 1 being filled with a fluid and on which a device 3 according to the invention is attached. The device 3 according to the invention comprises a tank 4 which is filled with thixotroping substances and a pressure generating means 5; it can already be attached to the concerning container 1 or it can be transported to the place of accident in form of a mobile operation station by means of a vehicle (helicopter, water vessel, fire fighting vehicle). The device 3 according to the invention can be applied and positioned to the container which met with an accident by means of lugs 12. For easier handling the embodiment shown in FIG. 1 comprises arrestable rolls 6.

The tank 4 of the device 3 according to the invention is connected with a feeding means, e.g. a flexible hose 7. The hose 7 is inserted into the container 1 similar to a probe head through a feeding opening 8. However it is also possible to insert the hose 7 directly into the leak 2. The embodiment of the feeding device as a flexible hose is advantageous in particular if the feeding opening 8 is situated at a location which is difficult to access. The tank 4 of the device 3 according to the invention can be merely applied onto the container 1 or can be fixed at the container 1 by means of adhesion magnets or the lugs 12.

The pressure generating means 5, e.g. a pump or a gas pressure system, provides the feeding of the thixotroping substances into the hose 7. A feeding device 7a for providing surface-active agents in order for reliquefication of thixotroped material may be disposed between the pump 5 and tank 4. The hose 7 of the device 3 according to the invention is provided with nozzles 9 at its container-sided end, by means of which the thixotroping substances can be fed into the container 1. The nozzles can be aligned such, that they inject the thixotroping substances into the dangerous good in different directions, resulting in a preferably uniform distribution of the thixotroping substances. However, it is also possible to focus the nozzles 9 on a certain area within the container 1.

In order to get the thixotroping substances to the corresponding areas the nozzles 9 or the hose 7 respectively can be provided with locomotion means, e.g. backstroke nozzles 11. Fluid which has been pressurized within the pressure generating means 5, and which can be fed to backstroke nozzles 11 via a separate, preferably pipeline 10, preferably serve as driving means for the backstroke nozzles 11. However it is also possible to generate the necessary pressure for driving the nozzles 9 e.g. by means of nitrogen tables or to operate the drive electrically (using for example a battery).

The navigation of the nozzles 9 can be carried out either by a standardized grating of the available space within the container 1 or via an individual provided control program or via manual controlling respectively. Thus the nozzles 9 can be maneuvered to the leak 2 of the container 1, therewith enabling prevention of discharging of the fluid within the container 1 as quickly as possibly by means of local thixotroping of a plug-like area. It is also possible to guide the container-sided end of the hose 7 on predetermined tracks along the wall of the container in order to generate a thixotroped layer which covers the inner surface of the container 1.

FIG. 2 shows another embodiment providing a withdrawal means which sucks the liquid to be thixotroped out of a first container 1 and pumps it into a second container 14 for thixotroping purposes. The withdrawal means can be designed in form of a separate hose 7. Therewith the first container 1 is emptied and the dangerous fluid is thixotropical capable for interim storage. In case of an endangered tanker 15 (as shown in FIG. 2) the second containers 14 can be misplaced into the sea to be taken up again at a later point of time. In FIG. 2 an especially preferred embodiment is shown which provides several second containers 14 which are connected to each other.

With every embodiment of the device according to the invention for feeding thixotroping substances no structural modifications to the container are required. Thus the device according to the invention can be advantageously used with all fluid containers which are already on the market.

We claim:

1. A device for feeding one or more substances reversibly thixotroping a liquid to a container for storing said liquid, said device comprising:
    a mobile operation station configured for transportation via land vehicles, water vehicles, aircraft, or helicopter, and for detachable connection to a land vehicle, water vessel, or aircraft, the station comprising:
    a tank containing thixotroping substances;
    a feeder for transportation of the thixotroping substances from the tank into the container which contains the liquid, and
    a pressure generator for creating a pressure gradient in the thixotroping substances within the feeder which is directed from the tank to the container.

2. The device according to claim 1 wherein the thixotroping substances are surface active metal oxides.

3. The device according to claim 1 further comprising an adhesive agent added to the thixotroping substances.

4. The device according to claim 3, wherein the adhesive agents are selected from a group consisting of one or more polyalcohols, polysaccharides, polycarbonic acids, their salts, esters of the inorganic acids, and acids of sulfur and/or phosphorus.

5. The device according to claim 1, wherein the thixotroping substances are selected from the group consisting of one or more of $SiO_2$ and/or $TiO_2$ and/or $Al_2O_3$ and/or $ZrO_2$ and/or $FeO_3$.

6. The device according to claim 1, wherein the feeder is flexible.

7. The device according to claim 6, wherein at least one nozzle is provided at a container-sided end of the flexible feeder.

8. The device according to claim 6, further comprises a driver and a controller for the driver disposed at the container-sided end of the flexible feeder.

9. The device according to claim 8, wherein the pressure generator serves as the driver.

10. The device according to claim 1, wherein the pressure generator comprises at least one compressor.

11. The device according to claim 1 further comprising a withdrawal hose for sucking the liquid to be thixotroped out of the container and into a second container or back to the first container for thixotroping purposes.

12. The device according to claim 11 further comprising several second interconnected containers.

13. The device according to claim 1, wherein the device is designed so that spatial partial areas of the liquid in the volume of the container can be thixotroped.

14. A device for feeding one or more substances reversibly thixotroping a liquid to a container for storing said liquid, said device comprising:
 a mobile operation station configured for transportation via land vehicles, water vehicles, aircraft, or helicopter, and for detachable connection to a land vehicle, water vessel, or aircraft, the station comprising:
 a tank containing thixotroping substances;
 a feeder for transportation of the thixotroping substances from the tank to the liquid container;
 a pressure generator for creating a pressure gradient in the thixotroping substances within the feeder, the pressure gradient being directed from the tank to the container; and
 a feeding device for providing surface-active agents for the reliquefaction of thixotroped material.

15. The device according to claim 14 wherein the surface-active agents are tensides.

16. The device according to claim 15 wherein the feeder is a flexible hose.

* * * * *